United States Patent [19]

Lee et al.

[11] Patent Number: 5,247,510
[45] Date of Patent: Sep. 21, 1993

[54] INCREASING STORAGE DENSITY OF OPTICAL DATA MEDIA BY DETECTING A SELECTED PORTION OF A LIGHT SPOT IMAGE CORRESPONDING TO A SINGLE DOMAIN

[75] Inventors: Neville K. S. Lee, Sherborn, Mass.; Quocdung T. Lam, San Jose, Calif.; Peter van Roekens, Wellesley, Mass.

[73] Assignee: Digital Equipment Corporation, Maynard, Mass.

[21] Appl. No.: 545,873

[22] Filed: Jun. 29, 1990

[51] Int. Cl.[5] .............................. G11B 7/12
[52] U.S. Cl. .................. 369/118; 369/112; 369/44.23
[58] Field of Search .......... 369/118, 112, 100, 110, 369/43, 44.11, 44.14, 44.23, 44.41

[56] References Cited

U.S. PATENT DOCUMENTS

| | | | |
|---|---|---|---|
| 3,812,477 | 5/1974 | Wieder | 340/173 LM |
| 3,919,562 | 11/1975 | Whitman | 250/570 |
| 3,956,582 | 5/1976 | Bouwhuis | 178/6.6 R |
| 4,349,901 | 9/1982 | Howe | 369/45 |
| 4,375,096 | 2/1983 | Gorog et al. | 369/102 |
| 4,460,990 | 7/1984 | Opheij | 369/112 |
| 4,531,205 | 7/1985 | Faugeras | 369/13 |
| 4,536,866 | 8/1985 | Jerome et al. | 369/112 |
| 4,599,714 | 7/1986 | Endo | 369/110 |
| 4,766,585 | 8/1988 | Fukumoto et al. | 369/46 |
| 4,969,142 | 11/1990 | Nagashima et al. | 369/109 |
| 5,081,617 | 1/1992 | Gelbart | 369/112 |
| 5,084,850 | 1/1992 | Yanagawa | 369/44.41 |
| 5,121,378 | 6/1992 | Hirose et al. | 369/112 |
| 5,153,870 | 10/1992 | Lee et al. | 369/111 |
| 5,161,134 | 11/1992 | Lee | 369/13 |

FOREIGN PATENT DOCUMENTS 0343727 11/1989 European Pat. Off. .

OTHER PUBLICATIONS

Patent Abstracts of Japan, vol. 12, No. 477 (P-800)[3324], Dec. 14, 1988 (Japanese patent abstract JP-A-63 193 356).

Primary Examiner—Paul M. Dzierzynski
Assistant Examiner—Jim Beyer
Attorney, Agent, or Firm—Fish & Richardson

[57] ABSTRACT

A light detection apparatus includes at least one re-imaging lens that re-images a light beam reflected from an optical storage medium, to form an image of a light spot formed by the light beam on the storage medium. At least one detector detects a selected portion of the image The selected portion of the image contains only such information as is encoded on a region of the optical data storage medium that is illuminated by a corresponding portion of the light spot.

57 Claims, 7 Drawing Sheets

INCREASING STORAGE DENSITY OF OPTICAL DATA MEDIA BY DETECTING A SELECTED PORTION OF A LIGHT SPOT IMAGE CORRESPONDING TO A SINGLE DOMAIN

BACKGROUND OF THE INVENTION

This invention relates to increasing the storage density of optical drives, for example, magneto-optical, compact disk, and write-once-read-many (WORM) drives. For purposes of illustration, this specification focuses on magneto-optical drives. It will be apparent to those skilled in the art that the principles of the invention can be readily applied to other optical drives as well.

In the writing process of typical magneto-optical drives, a laser produces a light beam that passes through an objective lens that focuses the light beam onto a magneto-optical disk. The central portion of the light beam heats a microscopic spot on a magnetic layer within the magneto-optical disk, while a biased magnetic field is applied in the vicinity of the light spot on the disk. The heat of the light spot temporarily lowers the coercivity of the magnetic layer. In the central, hottest portion of the light spot the coercivity of the magnetic layer is lowered enough that the magnetic field causes the magnetic orientation of the magnetic layer to reverse direction. As the magnetic layer cools, the local orientation of the magnetic layer becomes fixed to form a domain on the disk representing a bit of information. The presence of a domain having a reversed magnetic orientation at a given location on the disk represents a "1" while the absence of such a domain represents a "0."

In the reading process of typical magneto-optical drives, a laser produces a polarized light beam that passes through a first polarized beam splitter and passes through an objective lens that focuses the light beam onto a magneto-optical disk. The information stored at the point on the magneto-optical disk at which the light beam is focused causes the polarization of the light beam to shift slightly clockwise or slightly counterclockwise, depending on whether the information stored on the disk is a "1" or a "0," as the light beam reflects off of the disk. The reflected light beam passes back through the objective lens along the same path as the path of the incident light beam. The objective lens collimates the reflected light beam, which returns to a light detector assembly.

One approach to increasing recording density, described in U.S. patent application Ser. No. 07/373,939, filed Jun. 29, 1989, by Neville Lee et al., titled "Method for Increasing Track Density of Magneto-Optical Storage Media," and assigned to the assignee of the instant invention, involves constructing guard bands on the disk between concentric tracks on the disk, or between turns of a spiral track on the disk. With this arrangement, the number of concentric tracks (or the number of turns of a spiral track) can be increased, because the guard band can be located under an upper portion of the light spot as the drive reads one track (or turn of a spiral track), and under a lower portion of the light spot as the drive reads a neighboring track (or turn of a spiral track), without interference occurring between domains of information in neighboring tracks (or neighboring turns of the spiral track). In other words, the light beam is not affected by the domains of more than one track (or turn of a spiral track) at a time.

Another approach to increasing recording density, disclosed in U.S. patent application Ser. No. 07/373,991, now U.S. Pat. No. 5,161,134, filed Jun. 29, 1989, by NeVille Lee, titled "Method for Increasing Linear Bit Density in Magneto-Optical Storage Media," and assigned to the assignee of the instant invention, involves locating a slit between the objective lens and the disk. The length of the slit is parallel to the radial direction on the disk. The lengthwise edges of the slit cut off portions of the light beam, thereby allowing the domains of information on a given track to be recorded closer to each other without interference occurring between adjacent domains on a given track. In other words, the light beam is not affected by more than one domain within a track at a time.

SUMMARY OF THE INVENTION

The invention provides a new method of reading information in which, instead of analyzing the polarization of the entire reflected light beam, the reflected light beam is re-imaged to form a picture of the read spot. One or more portions of the re-imaged light spot, corresponding to portions of the "read" light spot on the disk surface, are analyzed in isolation. Thus, the re-imaged light spot contains more than one bit of information. The isolation of one or more details of the re-imaged spot is analogous to isolation of one or more details of a photograph. This invention is motivated by the realization that a domain can be written much smaller than a conventional reading process can resolve it. By providing for spatial discrimination within the re-imaged light spot during the reading process, the invention enables densely written domains to be resolved, thereby increasing the range of useful recording densities for a given size of a read/write light spot.

The invention features a light detection apparatus that includes at least one re-imaging lens that re-images a light beam reflected from an optical storage medium, to form an image of a light spot formed by the light beam on the storage medium. At least one detector detects a selected ion of the image. The selected portion of the image contains only such information as is encoded on a region of the optical data storage medium that is illuminated by a corresponding portion of the light spot.

In one embodiment the re-imaging lens re-images the light beam onto a plate having a pinhole aperture The re-imaging lens preferably has a focal length that is greater than a focal length of an objective lens that focuses the light beam on the storage medium and that collimates the light beam after reflection from the storage medium. The image on the plate is a magnified image of the light spot on the storage medium. The image on the plate is centered on the aperture. A central portion of the light beam that includes a central portion of the image passes through the aperture. The corresponding central portion of the light spot on the storage medium covers a location at which a domain of information is stored. A peripheral portion of the light beam that includes a peripheral portion of the image is blocked by the plate. The corresponding peripheral portion of the light spot covers locations on the storage medium at which domains of information other than the domain covered by the central portion of the light spot are stored. A collimating lens collimates the portion of the light beam that passes through the aperture.

The storage medium is a magneto-optical disk. The magneto-optical disk contains domains that rotate an angle of polarization of the light beam as the light beam reflects off of the magneto-optical disk. A polarization beam splitter splits the portion of the light beam that passes through the aperture and the collimating lens into two parts having intensities proportional to the horizontal and vertical components of polarization of the reflected light beam. Two detectors respectively detect the two parts of the light beam.

In another embodiment a polarization beam splitter splits the light beam reflected from the magneto-optical disk into two parts. Two re-imaging lenses re-image the two parts of the light beam in a manner such that the two parts of the light beam form images on a pair of respective combination detectors (detector arrays). Each combination detector includes an array of light-sensitive detection elements. The image on each combination detector includes a plurality of image portions covering a plurality of respective light-sensitive detection elements. Each image portion is an image of a portion of the light spot formed by the light beam on the storage medium.

In another embodiment there is one re-imaging lens that re-images the reflected light beam onto the polarization splitter. The polarization splitter splits the re-imaged light beam into the two parts, which are respectively detected by the two combination detectors.

The invention provides detection systems that can resolve domains having dimensions smaller than the dimensions of the light spot on the disk by processing and conditioning the light beam after it is reflected from the storage media. The invention allows both the track density and the density of domains within each track to be increased without requiring structural changes to the information storage media or to the recording head. Only the detection apparatus need be modified. By providing for increased densities of information on magneto-optical disks, the invention reduces the cost per MBit of disk drives. The invention can be coupled with other schemes directed at increasing storage density, including the schemes outlined above in the Background section, to further increase storage density. In addition, the embodiments of the invention that utilize combination detectors improve the performance of magneto-optical drives by enabling multiple tracks of information on the disk to be read simultaneously.

Other advantages and features will become apparent from the following description of the preferred embodiments and from the claims.

DESCRIPTION OF THE PREFERRED EMBODIMENTS

We first briefly describe the drawings.

Drawings

Structure

Figure 1:
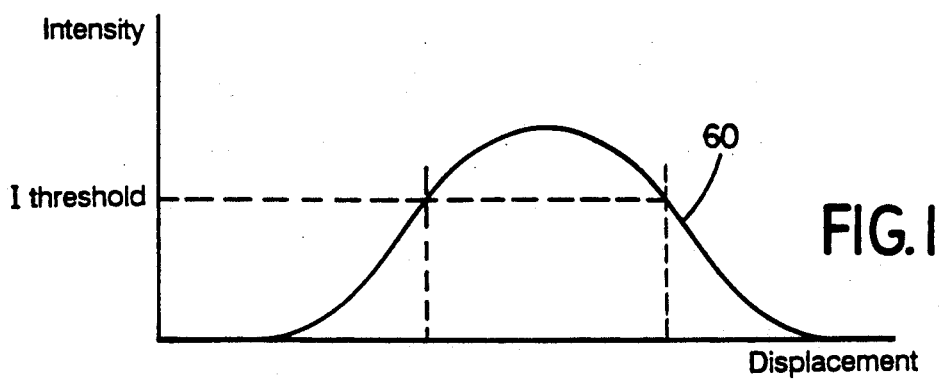
FIG. 1 is a graphical representation of the intensity of a light spot on a disk as a function of displacement.

Referring to FIG. 1, in the writing process of a magneto-optical disk drive, a light spot having a Gaussian distribution represented by curve 60 is formed on a magnetic layer of magneto-optical disk. The portion of the light spot that has an intensity greater than $I_{threshold}$ heats the underlying magnetic layer above a threshold at which the magnetic field causes the local orientation of the magnetic layer to reverse direction. Thus, a domain forms on the disk, having dimensions that match with the portion of the light spot having an intensity greater than $I_{threshold}$.

Figure 2:
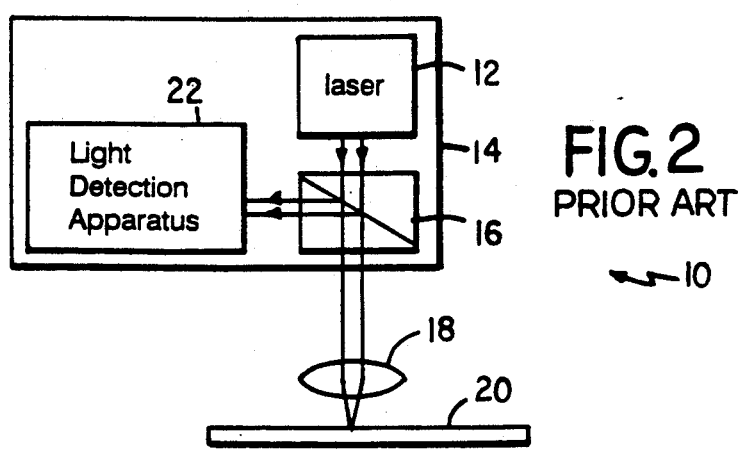
FIG. 2 is a schematic representation of a disk drive according to the invention.

Referring to FIG. 2, in a conventional magneto-optical disk drive 10 a laser 12 in a static optics package 14 produces a polarized light beam that passes through a polarized beam splitter 16. An objective lens 18 focuses the polarized light beam onto magneto-optical disk 20. The light beam reflects back through objective lens 18, which collimates the reflected light beam. The light beam returns to static optics package 14, within which polarized beam splitter 16 deflects the reflected light beam to light detection apparatus 22.

Figure 3:
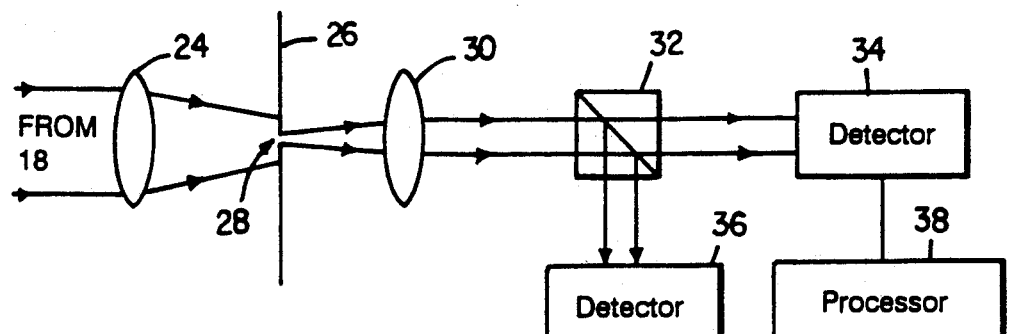
FIG. 3 is a schematic representation of one embodiment of a light detection apparatus according to the invention.

Referring to FIG. 3, in one embodiment of the invention, light detection apparatus 22 includes a re-imaging lens 24 that re-images the reflected light beam onto a plate 26 having a pinhole aperture 28. Re-imaging lens 24 preferably has a focal length that is greater than the focal length of objective lens 18. Consequently, according to principles of microscope enlarging, the re-imaged light spot on plate 26 has a greater variance in its Gaussian distribution than the light spot on the magneto-optical disk. In other words, the light spot on plate 26 is a magnified image of the light spot that is formed on magneto-optical disk 20.

A portion of the light beam corresponding to the central portion of the light spot on plate 26 passes through aperture 28. Collimating lens 30 collimates the portion of the light beam that passes through aperture 28. A polarized beam splitter 32 splits the collimated light beam into two parts each having an intensity proportional to a respective component of polarization of the reflected light beam. For example, polarized beam splitter 32 might transmit the vertical component of polarization of the light and reflect the horizontal component of polarization of the light, in which case detectors 34 and 36 detect the intensity of the vertically polarized and horizontally polarized parts, respectively, of the light beam. Processor 38 subtracts the output of one of the detectors from the output of the other to obtain a differential signal representative of the angle of polarization of the reflected light beam. The differential signal indicates whether the location on magneto-optical disk 20 that is illuminated by the central portion of the light spot contains a "1" or a "0."

Figure 4:
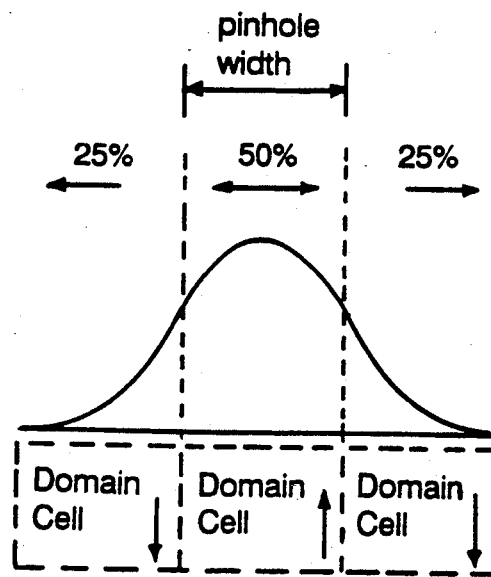
FIG. 4 is a graphical representation of an example of the intensity of a re-imaged light spot versus displacement, according to the embodiment of the invention shown in FIG. 3.

Referring to FIG. 4, the light spot on plate 26 is a magnified image of the light spot on magneto-optical disk 20, which covers more than one domain. FIG. 4 shows a numerical example of the spatial distribution of the intensity of light incident on a spot that covers three domain cells on disk 20. Approximately twenty-five percent of the total light intensity of the light spot on disk 20 illuminates the leftmost domain cell, approximately twenty-five percent of the total light intensity illuminates the rightmost domain cell, and fifty percent of the total light intensity illuminates the central domain cell. In this example, using a conventional detection method, the signal-to-noise ratio would be 0 dB, because the polarization of light reflected from the leftmost and rightmost domain cells would in effect cancel the polarization of light reflected from the central domain cell. According to the detection method of the invention, however, only the central portion of the image of the light spot covers aperture 28. Thus, only the central portion of the re-imaged light beam, the portion of the light beam that corresponds to the portion of the light spot that illuminates the central domain cell on the disk, reaches detectors 34 and 36. Ideally, the dimensions of aperture 28 should match exactly the dimensions of a portion of the light spot that illuminates a domain of information on disk 20, so that the signal-to-noise ratio is maximized. The leftmost and rightmost domains do not interfere with the central portion of the re-imaged light beam that reaches detectors 34 and 36, and hence aperture 28 reduces cross-talk between the domains. The apparatus of FIG. 3 can resolve domains having dimensions smaller than the "read" light spot, at a cost of a slight reduction in the intensity of light reaching the detectors and hence a slight reduction in the signal-to-noise ratio. In the example shown in FIG. 4, half of the intensity of the light is blocked and hence the signal-to-noise ratio is only 3 dB less than the signal-to-noise ratio associated with an ideal, infinitely large domain.

Figure 5:
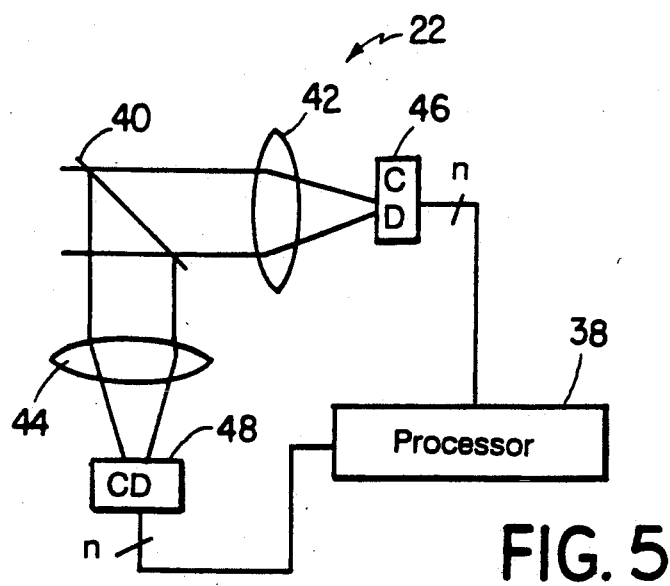
FIG. 5 is a schematic representation of another embodiment of a light detection apparatus according to the invention.
Figure 6:
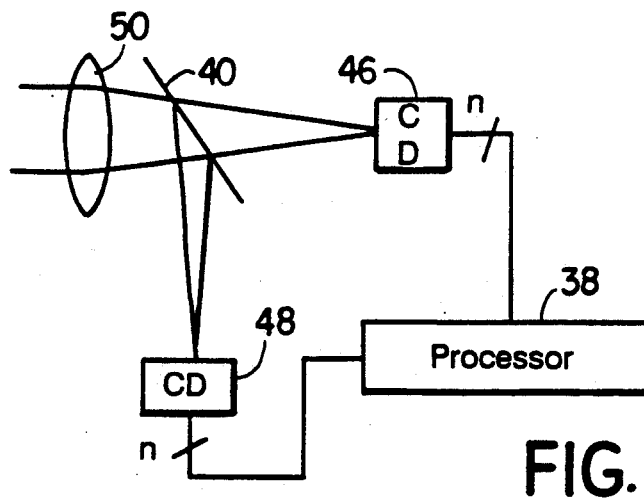
FIG. 6 is a schematic representation of yet another embodiment of a light detection apparatus according to the invention.

Referring to FIG. 5, in another embodiment of the invention, light detection apparatus 22 includes a polarized beam splitter 40 that splits the reflected light beam into two parts each having an intensity proportional to a respective component of polarization of the reflected light beam. Re-imaging lenses 42 and 44 respectively re-image the two parts to the reflected light beam onto two combination detectors 46 and 48. Re-imaging lenses 42 and 44 each preferably have a focal length that is greater than the focal length of objective lens 18. Consequently, the re-imaged light spots on combination detectors 46 and 48 are magnified images of the light spot that is formed on magneto-optical disk 20. Combination detectors 46 and 48 each contain an array of light-sensitive detection elements that are illuminated by the re-imaged light spots. Processor 38 subtracts the outputs of light-sensitive detection elements in one array from the outputs of corresponding light-sensitive detection elements in the other array to obtain a set of differential signals representative of the angle of polarization of various portions of the reflected light beam. Referring to FIG. 6, in an alternative embodiment, a single re-imaging lens 50 re-images the reflected light beam onto combination detectors 46 and 48 via polarized beam splitter 40, which splits the light beam into the two parts that are detected by combination detectors 46 and 48.

Figure 7:
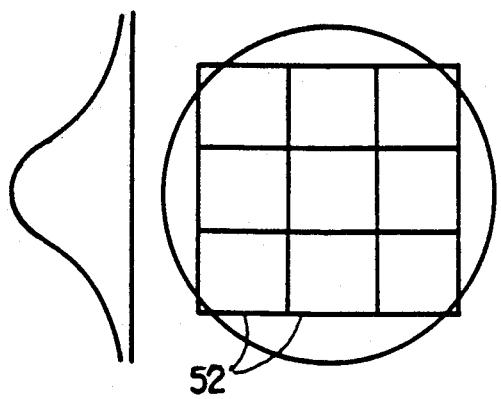
FIG. 7 is a graphical representation of the intensity and spatial distribution of a re-imaged light spot according to the embodiments of the invention shown in FIGS. 5 and 6.
Figure 8:
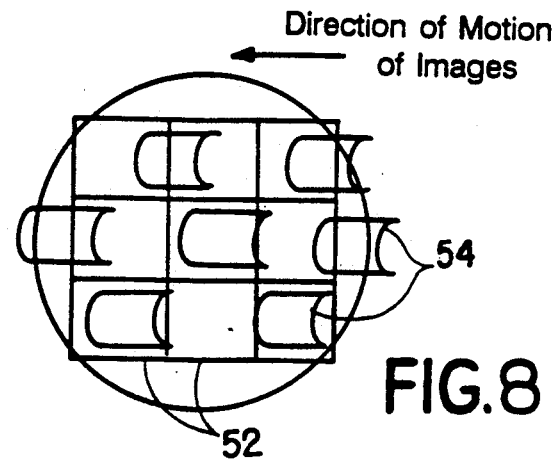
FIG. 8 is a graphical representation of the spatial distribution of a re-imaged light spot according to the embodiments of the invention shown in FIGS. 5 and 6, showing the locations at which domains are re-imaged.

Referring to FIG. 7, the magnified re-imaged light spot on a combination detector 46 or 48 illuminates the array of light-sensitive detection elements 52 that are contained within the combination detector. The light spot has a Gaussian distribution of intensity on the combination detector as shown. Each light-sensitive detection element 52 in the array has a counterpart in the other array that is illuminated by the same portion of the re-imaged light spot. Referring to FIG. 8, the magnified re-imaged light spot on a combination detector 46 or 48 can contain images 54 of several domains that are located on magneto-optical disk 20.

Operation

In operation of the embodiment of the invention shown in FIG. 3, domains of information are written onto magneto-optical disk 20 using a light beam that forms a light spot on the magneto-optical disk having approximately the same dimensions as the light spot that is used during the reading process. The cross-track size of the domains may be controlled by controlling the intensity of the light beam. The linear size of the domains along a track may be controlled by controlling the duration of pulses of a magnetic coil that causes dipoles in the magneto-optical disk to flip as the disk turns under the light beam. Thus, during the recording process domains having dimensions smaller than the dimensions of the light spot can be written onto the disk. During the reading process processor 38 subtracts the output of one of the detectors 34 or 36 from the output of the other detector to obtain a differential signal representative of the angle of polarization of the reflected light beam. The differential signal indicates whether the location on magneto-optical disk 20 that is illuminated by the central portion of the light spot contains a "1" or a "0." In this embodiment of the invention tracking may be accomplished by means of a conventional sample servo tracking method or a pre-grooved disk tracking method.

Figure 9:
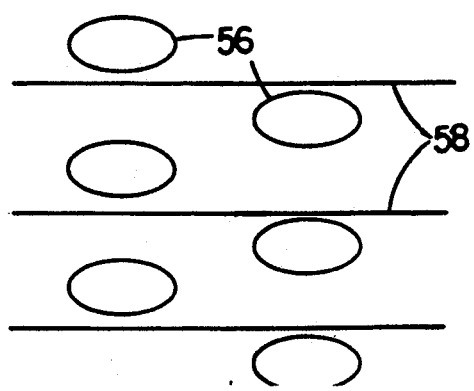
FIG. 9 is a schematic representation of servo pads that are encoded on a magneto-optical disk in order to enable tracking in the embodiments of the invention shown in FIGS. 5 and 6.
Figure 10:
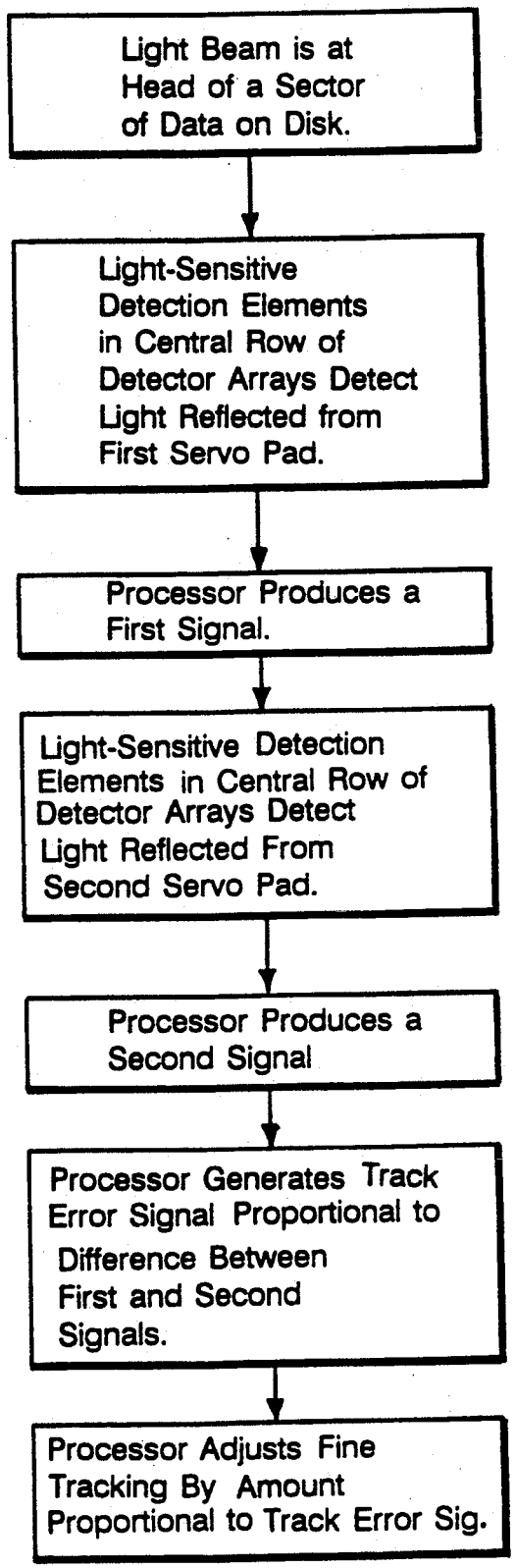
FIG. 10 is a flowchart diagram of the tracking procedure for the embodiments of the invention shown in FIGS. 5 and 6.

FIGS. 9 and 10 illustrate an example of a sample servo tracking method that is used in conjunction with the embodiments of the invention shown in FIGS. 5 and 6. Each track has a pair of servo pads 56 that are encoded in proximity to the center line 58 of the track, at the head of each sector of data on the magneto optical disk. For each track, one servo pad is encoded slightly above the center line and the other servo pad is encoded slightly below the center line of the track and displaced longitudinally along the track from the first servo pad. The servo pads may be domains similar to the domains of information encoded along the center line of the track, or may be structures, such as pits, that utilize destructive interference to change the amplitude of the reflected light beam.

As light reflected from the servo pad located immediately above the center line of the central track in FIG. 9 reflects back to the light-sensitive detection elements in the central row of the detector arrays, the light-sensitive detection elements in the central row detect light reflected from the servo pad. The processor produces a signal having an intensity proportional to the amount of light reflected from the servo pad that hits the detection elements in the central row. As light reflected from the servo pad located immediately below the center line of the central track in FIG. 9 reflects back to the detection elements in the central row, the processor produces another signal having an intensity proportional to the amount of light reflected from the servo pad that hits the detection elements in the central row. If the two signals have the same intensity, no realignment is necessary because the central row of detection elements is properly aligned on the center line of the central track in FIG. 9. If one signal is stronger than the other, the processor adjusts the fine tracking by an amount proportional to the difference between the two signals, in order to align the central row of elements with the center line of the central track. The light-sensitive detection elements are constructed in a manner such that when the central track is properly aligned with the central row of elements, the tracks other than the central track will line up with the other rows of elements. Thus, alignment of the central row of elements with the central track is sufficient to align all of the rows of elements.

Figure 11:
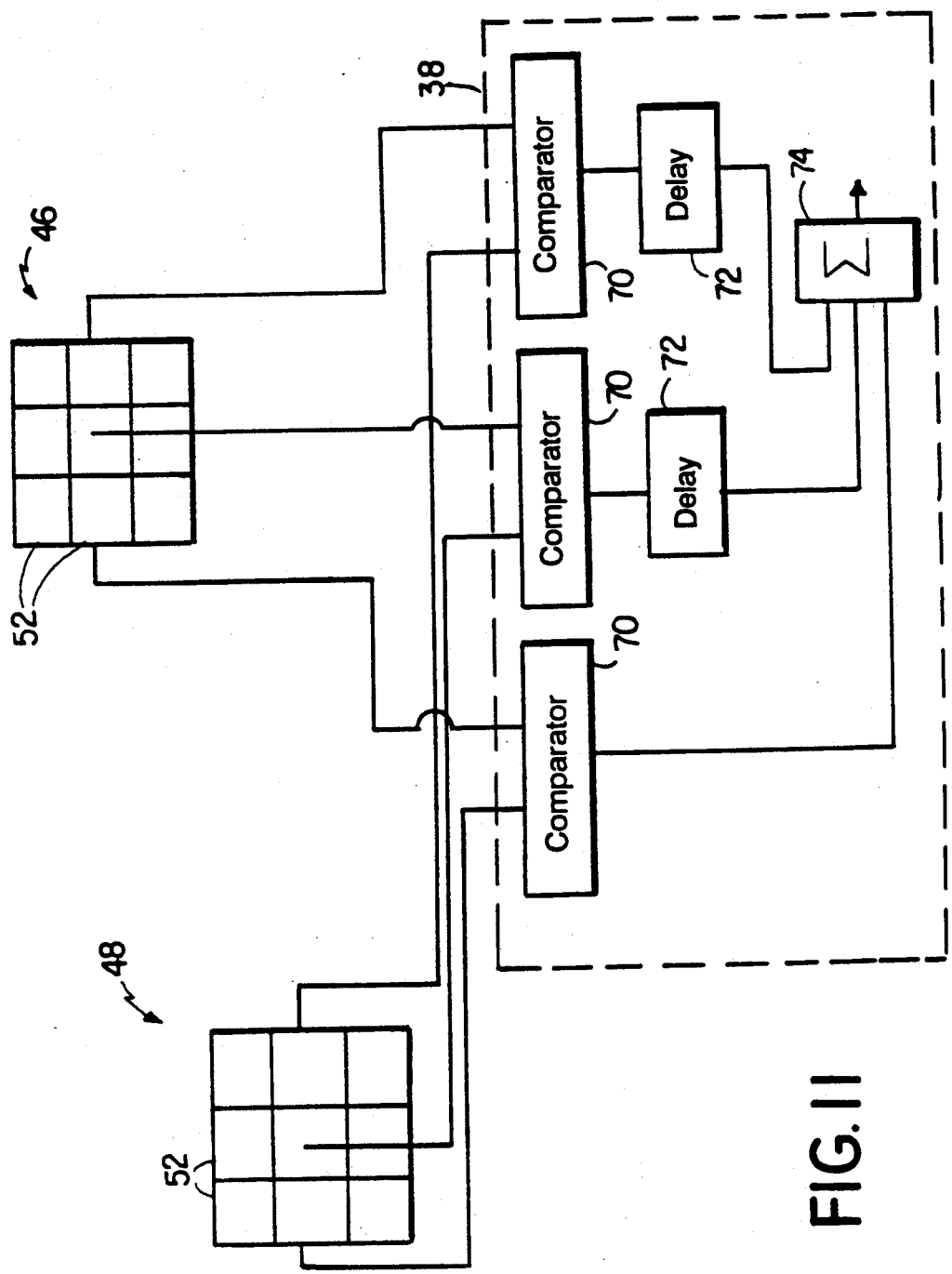
FIG. 11 is a schematic representation of a signal enhancement apparatus for use in conjunction with the embodiments of the invention shown in FIGS. 5 and 6.
Figure 12:
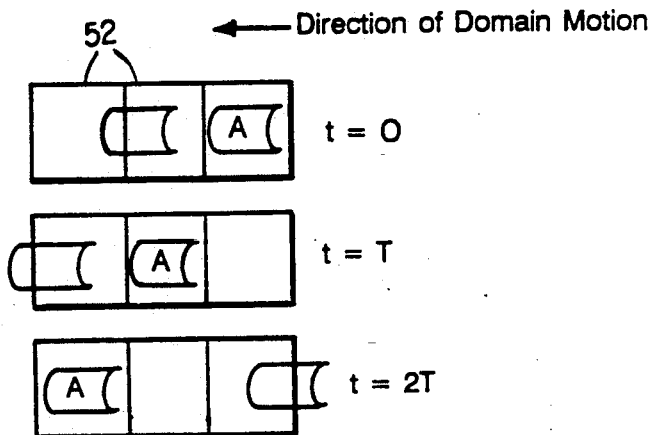
FIG. 12 is a graphical representation of a re-imaged light spot according to the embodiments of the invention shown in FIGS. 5 and 6, showing the relative positions of detector elements and images of domains at selected points in time.
Figure 13:
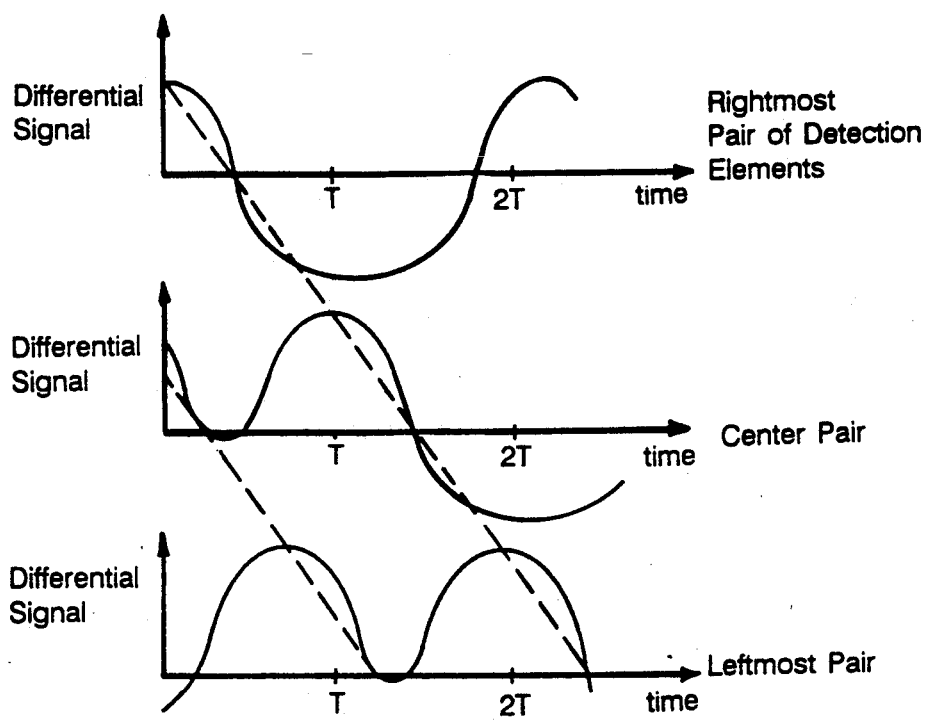
FIG. 13 is a graphical representation of differential signals corresponding to pairs of detector elements in the embodiments of the invention shown in FIGS. 5 and 6.

FIGS. 11, 12, and 13 illustrate the reading process of the embodiments of the invention shown in FIGS. 5 and 6, in a mode of operation in which only one track of information is read at a time. As shown in FIG. 11, in one illustrative signal enhancement arrangement, processor 38 includes a set of comparator circuits 70 that subtract the outputs of light-sensitive detection elements 52 in the central row of one combination detector 46 from the outputs of corresponding light-sensitive detection elements 52 in the central row of the other combination detector 48. All but one of the resulting differential signals pass through a set of delay circuits 72. Delay circuits 72 delay each differential signal by an amount of time equal to NT, where T is the amount of time that it takes for the image of a domain to pass from one detector element 52 to an adjacent detector element, and N is the number of positions away from the leftmost detector element in FIG. 11 of a detector element that is associated with the differential signal. A summer 74 sums the outputs of delay circuits 72 with the undelayed output of the leftmost detector element in FIG. 11.

FIG. 12 shows the relative positions of the detector elements 52 in the central row of one of the arrays and the images of domains as the images pass across the detector elements, at times t=0, t=T, and t=2T. FIG. 13 shows the differential signals, as a function of time, corresponding to each of the pairs of light-sensitive detection elements in the central rows of combination detectors 46 and 48 in FIG. 11. It will be apparent that the output of summer 74 in FIG. 11 at time t=2T represents the presence of domain 76 (FIG. 12), with a signal-to-noise ratio that is higher than the signal-to-noise ratio of any single differential signal from a comparator circuit 70, because the summation re-enforces the signal while the noise tends to cancel out. It will also be apparent that there are numerous other signal enhancement techniques that can be used in conjunction with the combination detectors of the embodiments of the invention shown in FIGS. 5 and 6, to improve the detection of domains.

Figure 14:
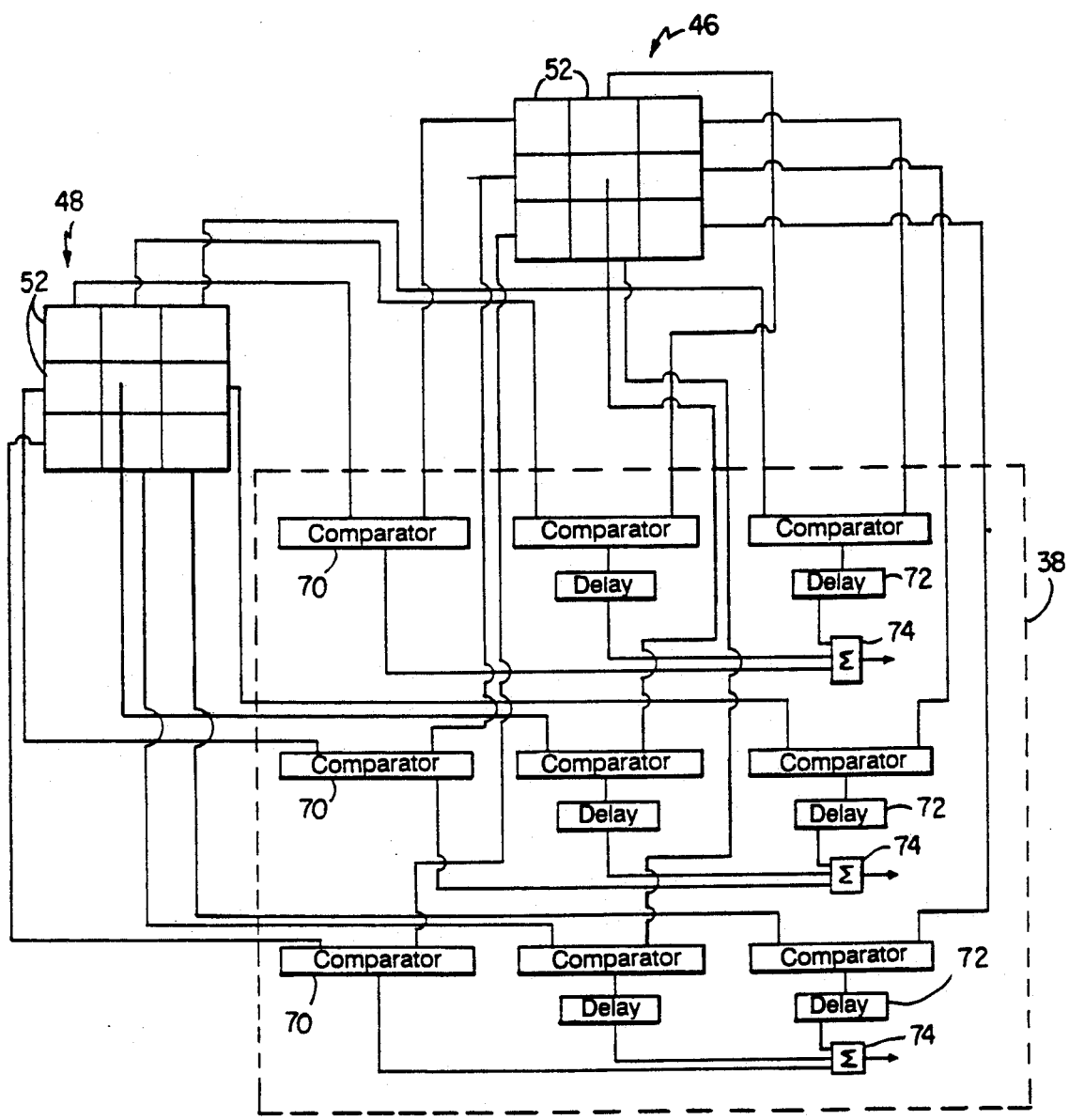
FIG. 14 is a schematic representation of a signal enhancement apparatus that reads multiple tracks of information simultaneously, for use in conjunction with the embodiments of the invention shown in FIGS. 5 and 6.

Another advantage of the invention is improved performance provided by simultaneous reading of multiple tracks of information. FIG. 14 illustrates a signal enhancement arrangement that reads multiple tracks of information simultaneously, for use in conjunction with the embodiments of the invention shown in FIGS. 5 and 6. Processor 38 includes comparator circuits 70 that subtract the outputs of light-sensitive detection elements 52 in each row of one combination detector 46 from the outputs of corresponding light-sensitive detection elements 52 in each row of the other combination detector 48. The resulting differential signals pass through a set of delay circuits 72. A set of summers 74 sum the outputs of the delay circuits 72 for each of the rows of detection elements.

Note that in the cross-track direction, the images of the domains must line up with the light-sensitive detection elements 52. Thus, there is an enforced relationship between the cross-track dimensions of the detection elements and the cross-track dimensions of the images of the domains. So long as the enforced relationship is maintained, a tracking method such as the sample servo method shown in FIGS. 9 and 10 will keep each row of detection elements centered on the centerline of each track of domains. In the direction along each track, however, the domains do not line up with the detection elements. Rather, the domains are spaced at varying distances from each other.

Figure 15:
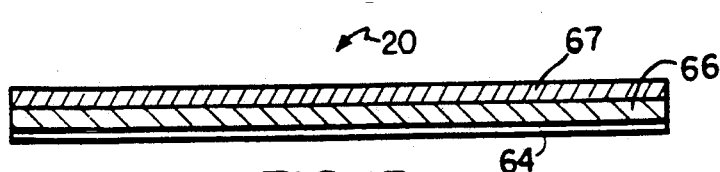
FIG. 15 is a schematic representation of a magneto-optical disk for use with a disk drive according to the invention.

The resolution of the image of the domains depends on the wavelength of the light inside of the storage media. Since the wavelength of light for a given light source is less in material having a high index of refraction than in a material having a low index of refraction, it is desirable to use a material having a high index of refraction. As shown in FIG. 15, the minimum dimensions of the domains can be decreased by coating the thin magnetic layer 64 within magneto-optical disk 20 with a dielectric material 66 having a high index of refraction, such as a diamond-like treated-carbon coating, or a silicon nitride coating. An overcoat 67 of material such as transparent plastic protects both magnetic layer 64 and coating 66. The wavelength of the "read" light beam within coating 66, which is the wavelength of the incident light on magnetic layer 64, is less than the wavelength of the light in air. Thus, coating 66 enables resolution of domains having dimensions smaller than the wavelength of the light in air, but not smaller than the wavelength of the light as it passes through coating 66. The effect of using coating 66 is similar to the effect of using a shorter-wavelength laser.

Other embodiments are within the following claims.

What is claimed is:

1. A light detection apparatus for an optical data storage system, comprising at least one re-imaging lens for re-imaging a light beam produced by a light source and reflected from an optical storage medium to form an image of a light spot formed by said light beam on said storage medium, said light spot having a spatial distribution covering more than one domain of information stored in said storage medium, and at least one detector for detecting a selected portion of said image of said light spot covering more than one domain of information, said selected portion of said image containing only such information as is encoded on a region of said optical data storage medium that is illuminated by a corresponding portion of said light spot, said light detection apparatus further comprising a blocking device for allowing a selected portion of said light beam comprising said selected portion of said image to pass toward said at least one detector, while blocking an unselected portion of said light beam comprising an unselected portion of said image, said unselected portion of said image containing at least a portion of at least one domain of information.

2. A light detection apparatus in accordance with claim 1 wherein said blocking device comprises a plate comprising a pinhole aperture, said plate being located in an image plane of said re-imaging lens, said re-imaging lens re-images onto said plate said light beam reflected from said storage medium, in a manner such that said light beam forms on said plate said image of said light spot formed by said light beam on said storage medium, said image on said plate is centered on said aperture, a central portion of said light beam comprising a central portion of said image passes through said aperture, and a peripheral portion of said light beam comprising a peripheral portion of said image is blocked by said plate, and said at least one detector detects said portion of said light beam that passes through said aperture.

3. A light detection apparatus in accordance with claim 2, wherein said light detection further comprises a collimating lens for collimating said portion of said light beam that passes through said aperture, and said at least one detector detects said portion of said light beam that passes through said aperture and said collimating lens.

4. A light detection apparatus in accordance with claim 2 wherein said storage medium is a magneto-optical disk.

5. A light detection apparatus in accordance with claim 4 wherein said magneto-optical disk contains domains that rotate an angle of polarization of said light beam as said light beam reflects off of said magneto-optical disk, said light detection apparatus further comprises a polarization splitter for splitting said portion of said light beam that passes through said aperture into two parts each having an intensity proportional to a respective component of polarization of said reflected light beam, and there are two said detectors for respectively detecting said two parts of said light beam.

6. A light detection apparatus in accordance with claim 2 wherein said re-imaging lens has a focal length that is greater than a focal length of an objective lens that focuses said light beam on said storage medium and that collimates said light beam after reflection from said storage medium, and said image on said plate is a magnified image of said light spot on said storage medium.

7. A light detection apparatus for an optical data storage system, comprising at least one re-imaging lens for re-imaging a light beam produced by a light source and reflected from an optical storage medium to form an image of a light spot formed by said light beam on said storage medium, and at least one detector for detecting a selected portion of said image, said selected portion of said image containing only such information as is encoded on a region of said optical data storage medium that is illuminated by a corresponding portion of said light spot, wherein said light detection apparatus further comprises a blocking device for allowing a selected portion of said light beam comprising said selected portion of said image to pass toward said at least one detector, while blocking an unselected portion of said light beam, wherein said blocking device comprises a plate comprising a pinhole aperture, said plate being located in an image plane of said re-imaging lens, wherein said re-imaging lens re-images onto said plate said light beam reflected from said storage medium, in a manner such that said light beam forms on said plate said image of said light spot formed by said light beam on said storage medium, said image on said plate is centered on said aperture, a central portion of said light beam comprising a central portion of said image passes through said aperture, and a peripheral portion of said light beam comprising a peripheral portion of said image is blocked by said plate, wherein said at least one detector detects said portion of said light beam that passes through said aperture, wherein said central portion of said image corresponds to a central portion of said light spot on said storage medium, said central portion of said light spot covering a location on said storage medium at which a domain of information is stored, and wherein said peripheral portion of said image corresponds to a peripheral portion of said light spot on said storage medium, said peripheral portion of said light spot covering locations on said storage medium at which domains of information other than said domain covered by said central portion of said light spot are stored.

8. A light detection apparatus for an optical data storage system, comprising at least one re-imaging lens for re-imaging a light beam produced by a light source and reflected from an optical storage medium to form an image of a light spot formed by said light beam on said storage medium, and at least one detector for detecting a selected portion of said image, said selected portion of said image containing only such information as is encoded on a region of said optical data storage medium that is illuminated by a corresponding portion of said light spot, wherein said at least one detector is a combination detector comprising a plurality of rows of light-sensitive detection elements, and said at least one re-imaging lens re-images said light beam reflected from said storage medium in a manner such that said light beam forms on said at least one detector said image of said light spot formed by said light beam on said storage medium and said selected portion of said image covers said light-sensitive detection elements, wherein said light detection apparatus further comprises a processor for processing outputs of said light-sensitive detection elements, wherein said optical storage medium comprises a plurality of servo pads, a pair of said servo pads being encoded in proximity to a center line of each of a plurality of tracks of data on said optical storage medium, wherein said processor produces first and second signals corresponding to intensity of light reflected from first and second servo pads of said pair of servo pads and detected by a detection element in a tracking row of said combination detector, compares said first signal with said second signal, and adjusts fine tracking of said light detection apparatus by an amount proportional to a difference between said first and second signals in a manner such that said tracking row of said light-sensitive detection elements is aligned with a said track, and wherein said at least one detector is constructed in a manner such that each said row is aligned with a said track when said tracking row is aligned with a said track.

9. A light detection apparatus in accordance with claim 8 wherein said image on said combination detector comprises a plurality of image portions covering a plurality of respective said light-sensitive detection elements, and each said image portion is an image of a portion of said light spot formed by said light beam on said storage medium.

10. A light detection apparatus in accordance with claim 9 wherein said storage medium is a magneto-optical disk.

11. A light detection apparatus in accordance with claim 10 wherein said magneto-optical disk contains domains that rotate an angle of polarization of said light beam as said light beam reflects off of said magneto-optical disk, said light detection apparatus further comprises a polarization splitter for splitting said light beam reflected from said magneto-optical disk into two parts each having an intensity proportional to a respective component of polarization of said reflected light beam, and there are two said combination detectors for respectively detecting said two parts of said light beam.

12. A light detection apparatus in accordance with claim 11 wherein there are two said re-imaging lenses that respectively re-image said two parts of said light beam onto said two combination detectors.

13. A light detection apparatus in accordance with claim 11 wherein there is one said re-imaging lens that re-images said reflected light beam onto said polarization splitter.

14. A light detection apparatus in accordance with claim 8, wherein said processor produces a plurality of differential signals, each said differential signal corresponding to an output of a said light-sensitive detection element in a first said detector minus an output of a corresponding said light-sensitive detection element in a second said detector, and said processor analyzes said differential signals to detect domains of information smaller than said light spot on said storage medium.

15. A light detection apparatus in accordance with claim 14 wherein said processor is adapted to detect simultaneously domains of information contained in a plurality of tracks on said magneto-optical disk.

16. A light detection apparatus in accordance with claim 15, wherein said combination detector is arranged to detect simultaneously domains contained in a plurality of distinct and respective tracks on said magneto-optical disk.

17. A light detection apparatus in accordance with claim 8 wherein said portion of said light spot on said storage medium, which corresponds to said image portion covering said at least one light-sensitive detection element, covers a location on said storage medium at which a domain of information is stored.

18. A light detection apparatus for an optical data storage system, comprising at least one re-imaging lens for re-imaging a light beam produced by a light source and reflected from an optical storage medium to form an image of a light spot formed by said light beam on said storage medium, said light spot having a spatial distribution covering more than one domain of information stored in said storage medium, and at least one detector for detecting a selected portion of said image of said light spot covering more than one domain of information, said selected portion of said image containing only such information as is encoded on a region of said optical data storage medium that is illuminated by a corresponding portion of said light spot, wherein said at least one re-imaging lens has a focal length that is greater than a focal length of an objective lens that focuses said light beam on said storage medium and that collimates said light beam after reflection from said storage medium, and wherein said image is a magnified image of said light spot on said storage medium.

19. A light detection apparatus for an optical data storage system, comprising at least one re-imaging lens for re-imaging a light beam produced by a light source and reflected from an optical storage medium to form an image of a light spot formed by said light beam on said storage medium, and at least one detector for detecting a selected portion of said image, said selected portion of said image containing only such information as is encoded on a region of said optical data storage medium that is illuminated by a corresponding portion of said light spot, wherein said light detection apparatus further comprises said optical storage medium, said optical storage medium comprises a magnetic layer for storing said information and a refraction layer overlying said magnetic layer, said refraction layer has an index of refraction such that the wavelength of said light beam within said refraction layer is less than the wavelength of said light beam in air, said information encoded on said magnetic layer comprises domains smaller than a wavelength of said light beam in air but not smaller than the wavelength of said light beam as said light beam passes through said refraction layer, whereby said refraction layer has an index of refraction high enough to enable said light detection apparatus to resolve said domains.

20. An optical data storage media drive comprising
a light source for producing a light beam,
an objective lens for focusing said light beam on a storage medium, and for collimating said light beam after reflection from said storage medium,
and a light detection apparatus comprising
at least one re-imaging lens for re-imaging said light beam collimated by said objective lens to form an image of a light spot formed by said light beam on said storage medium, said light spot having a spatial distribution covering more than one domain of information stored in said storage medium,
and at least one detector for detecting a selected portion of said image of said light spot covering more than one domain of information, said selected portion of said image containing only such information as is encoded on a region of said optical data storage medium that is illuminated by a corresponding portion of said light spot,
said light detection apparatus further comprising a blocking device for allowing a selected portion of said light beam comprising said selected portion of said image to pass toward said at least one detector, while blocking an unselected portion of said light beam comprising an unselected portion of said image, said unselected portion of said image containing at least a portion of at least one domain of information.

21. A storage media drive in accordance with claim 20 wherein
said blocking device comprises a plate comprising a pinhole aperture, said plate being located in an image plane of said re-imaging lens,
said re-imaging lens re-images onto said plate said light beam collimated by said objective lens, in a manner such that
said light beam forms an image on said plate that is an image of a light spot formed by said light beam on said storage medium,
said image on said plate is centered on said aperture,
a central portion of said light beam comprising a central portion of said image passes through said aperture,
and a peripheral portion of said light beam comprising a peripheral portion of said image is blocked by said plate,
and said at least one detector detects said portion of said light beam that passes through said aperture.

22. A storage media drive in accordance with claim 21, wherein
said light detection further comprising a collimating lens for collimating said portion of said light beam that passes through said aperture,
and said at least one detector detects said portion of said light beam that passes through said aperture and said collimating lens.

23. A storage media drive in accordance with claim 21 wherein said storage medium is a magneto-optical disk.

24. A storage media drive in accordance with claim 23 wherein
said magneto-optical disk contains domains that rotate an angle of polarization of said light beam as said light beam reflects off of said magneto-optical disk,
said light detection apparatus further comprises a polarization splitter for splitting said portion of said light beam that passes through said aperture into two parts each having an intensity proportional to a respective component of polarization of said reflected light beam,
and there are two said detectors for respectively detecting said two parts of said light beam.

25. A storage media drive in accordance with claim 21 wherein
said re-imaging lens has a focal length that is greater than a focal length of said objective lens that focuses said light beam on said storage medium and that collimates said light beam after reflection from said storage medium,
and said image on said combination detector is a magnified image of said light spot on said storage medium.

26. An optical data storage media drive comprising
a light source for producing a light beam,
an objective lens for focusing said light beam on a storage medium, and for collimating said light beam after reflection from said storage medium,
and a light detection apparatus comprising
at least one re-imaging lens for re-imaging said light beam collimated by said objective lens to form an image of a light spot formed by said light beam on said storage medium,
and at least one detector for detecting a selected portion of said image, said selected portion of said image containing only such information as is encoded on a region of said optical data storage medium that is illuminated by a corresponding portion of said light spot,
wherein said light detection apparatus further comprises a blocking device for allowing a selected portion of said light beam comprising said selected portion of said image to pass toward said at least one detector, while blocking an unselected portion of said light beam,
wherein said blocking device comprises a plate comprising a pinhole aperture, said plate being located in an image plane of said re-imaging lens,
wherein said re-imaging lens re-images onto said plate said light beam collimated by said objective lens, in a manner such that
said light beam forms an image on said plate that is an image of a light spot formed by said light beam on said storage medium,
said image on said plate is centered on said aperture, a central portion of said light beam comprising a central portion of said image passes through said aperture, and a peripheral portion of said light beam comprising a peripheral portion of said image is blocked by said plate, wherein said at least one detector detects said portion of said light beam that passes through said aperture, wherein said central portion of said image corresponds to a central portion of said light spot on said storage medium, said central portion of said light spot covering a location on said storage medium at which a domain of information is stored, and wherein said peripheral portion of said image corresponds to a peripheral portion of said light spot on said storage medium, said peripheral portion of said light spot covering locations on said storage medium at which domains of information other than said domain covered by said central portion of said light spot are stored.

27. An optical data storage media drive comprising a light source for producing a light beam, an objective lens for focusing said light beam on a storage medium, and for collimating said light beam after reflection from said storage medium, and a light detection apparatus comprising at least one re-imaging lens for re-imaging said light beam collimated by said objective lens to form an image of a light spot formed by said light beam on said storage medium, and at least one detector for detecting a selected portion of said image, said selected portion of said image containing only such information as is encoded on a region of said optical data storage medium that is illuminated by a corresponding portion of said light spot, wherein said at least one detector is a combination detector comprising a plurality of rows of light-sensitive detection elements, and said at least one re-imaging lens re-images said light beam collimated by said objective lens in a manner such that said light beam forms on said at least one detector said image of said light spot formed by said light beam on said storage medium and said selected portion of said image covers said light-sensitive detection element, said light detection apparatus further comprises a processor for processing outputs of said light-sensitive detection element, wherein said optical storage medium comprises a plurality of servo pads, a pair of said servo pads being encoded in proximity to a center line of each of a plurality of tracks of data on said optical storage medium, wherein said processor produces first and second signals corresponding to intensity of light reflected from first and second servo pads of a said pair of servo pads and detected by a detection element in a tracking row of said combination detector, compares said first signal with said second signal, and adjusts fine tracking of said light detection apparatus by an amount proportional to a difference between said first and second signals in a manner such that said tracking row of said light-sensitive detection elements is aligned with a said track, and wherein said at least one detector is constructed in a manner such that each said row is aligned with a said track when said tracking row is aligned with a said track.

28. A storage media drive in accordance with claim 27 wherein said combination detector is located in an image plane of said re-imaging lens, said image on said combination detector comprises a plurality of image portions covering a plurality of respective said light-sensitive detection elements, and each said image portion is an image of a portion of said light spot formed by said light beam on said storage medium.

29. A storage media drive in accordance with claim 28 wherein said storage medium is a magneto-optical disk.

30. A storage media drive in accordance with claim 29 wherein said magneto-optical disk contains domains that rotate an angle of polarization of said light beam as said light beam reflects off of said magneto-optical disk, said light detection apparatus further comprises a polarization splitter for splitting said light beam reflected from said magneto-optical disk into two parts each having an intensity proportional to a respective component of polarization of said reflected light beam, and there are two said combination detectors for respectively detecting said two parts of said light beam.

31. A storage media drive in accordance with claim 30 wherein there are two said re-imaging lenses that respectively re-image said two parts of said light beam onto said two combination detectors.

32. A storage media drive in accordance with claim 30 wherein there is one said re-imaging lens that re-images said reflected light beam onto said polarization splitter.

33. A storage media drive in accordance with claim 27, wherein said processor produces a plurality of differential signals, each said differential signal corresponding to an output of a said light-sensitive detection element in a first said detector minus an output of a corresponding said light-sensitive detection element in a second said detector, and said processor analyzes said differential signals to detect domains of information smaller than said light spot on said storage medium.

34. A storage media drive in accordance with claim 33 wherein said processor is adapted to detect simultaneously domains of information contained in a plurality of tracks on said magneto-optical disk.

35. A storage media drive in accordance with claim 34, wherein said combination detector is arranged to detect simultaneously domains contained in a plurality of distinct and respective tracks on said magneto-optical disk.

36. A storage media drive in accordance with claim 27 wherein said portion of said light spot on said storage medium, which corresponds to said image portion covering said at least one light-sensitive detection element, covers a location on said storage medium at which a domain of information is stored.

37. An optical data storage media drive comprising a light source for producing a light beam, an objective lens for focusing said light beam on a storage medium, and for collimating said light beam after reflection from said storage medium, and a light detection apparatus comprising at least one re-imaging lens for re-imaging said light beam collimated by said objective lens to form an image of a light spot formed by said light beam on said storage medium, said light spot having a spatial distribution covering more than one domain of information stored in said storage medium, and at least one detector for detecting a selected portion of said image of said light spot covering more than one domain of information, said selected portion of said image containing only such information as is encoded on a region of said optical data storage medium that is illuminated by a corresponding portion of said light spot, wherein said at least one re-imaging lens has a focal length that is greater than a focal length of said objective lens that focuses said light beam on said storage medium and that collimates said light beam after reflection from said storage medium, and wherein said image is a magnified image of said light spot on said storage medium.

38. An optical data storage media drive comprising
a light source for producing a light beam,
an objective lens for focusing said light beam on a storage medium, and for collimating said light beam after reflection from said storage medium,
and a light detection apparatus comprising at least one re-imaging lens for re-imaging said light beam collimated by said objective lens to form an image of a light spot formed by said light beam on said storage medium, and at least one detector for detecting a selected portion of said image, said selected portion of said image containing only such information as is encoded on a region of said optical data storage medium that is illuminated by a corresponding portion of said light spot, wherein said storage media drive further comprises said optical storage medium, said optical storage medium comprises a magnetic layer for storing said information and a refraction layer overlying said magnetic layer, said refraction layer has an index of refraction such that the wavelength of said light beam within said refraction layer is less than the wavelength of said light beam in air, said information encoded on said magnetic layer comprises domains smaller than a wavelength of said light beam in air but not smaller than the wavelength of said light beam as said light beam passes through said refraction layer, whereby said refraction layer has an index of refraction high enough to enable said light detection apparatus to resolve said domains.

39. A method of detecting a light beam reflected from storage media in an optical data storage system, comprising the steps of re-imaging a light beam produced by a light source and reflected from an optical storage medium to form an image of a light spot formed by said light beam on said storage medium, said light spot having a spatial distribution covering more than one domain of information stored in said storage medium, and detecting a selected portion of said image of said light spot covering more than one domain of information, said selected portion of said image containing only such information as is encoded on a region of said optical data storage medium that is illuminated by a corresponding portion of said light spot, said method further comprising the step of allowing a selected portion of said light beam comprising said selected portion of said image to be detected, while blocking an unselected portion of said light beam, said unselected portion of said image containing at least a portion of at least one domain of information.

40. A method in accordance with claim 39 wherein
said step of re-imaging said light beam reflected from said storage medium comprises re-imaging said light beam onto a plate comprising a pinhole aperture, in a manner such that said light beam forms on said plate said image of said light spot formed by said light beam on said storage medium, said image on said plate is centered on said aperture, a central portion of said light beam comprising a central portion of said image passes through said aperture, and a peripheral portion of said light beam comprising a peripheral portion of said image is blocked by said plate, and said step of detecting said selected portion of said image comprises detecting said portion of said light beam that passes through said aperture.

41. A method in accordance with claim 40 wherein
said method further comprises the step of collimating said portion of said light beam that passes through said aperture, and said step of detecting said selected portion of said image comprises detecting said collimated portion of said light beam.

42. A method in accordance with claim 41 wherein said storage medium is a magneto-optical disk.

43. A method in accordance with claim 42 wherein
said magneto-optical disk contains domains that rotate an angle of polarization of said light beam as said light beam reflects off of said magneto-optical disk, said method further comprises the step of splitting said portion of said light beam that passes through said aperture into two parts each having an intensity proportional to a respective component of polarization of said reflected light beam, and said step of detecting said collimated portion of said light beam that passes through said aperture comprises detecting said two parts of said light beam.

44. A method in accordance with claim 40 wherein said image on said plate is a magnified image of said light spot on said storage medium.

45. A method of detecting a light beam produced by a light source and reflected from storage media in an optical data storage system, comprising the steps of re-imaging a light beam reflected from an optical storage medium to form an image of a light spot formed by said light beam on said storage medium, and detecting a selected portion of said image, said selected portion of said image containing only such information as is encoded on a region of said optical data storage medium that is illuminated by a corresponding portion of said light spot, said method further comprising the step of allowing a selected portion of said light beam comprising said selected portion of said image to be detected, while blocking an unselected portion of said light beam, wherein said step of re-imaging said light beam reflected from said storage medium comprises re-imaging said light beam onto a plate comprising a pinhole aperture, in a manner such that said light beam forms on said plate said image of said light spot formed by said light beam on said storage medium, said image on said plate is centered on said aperture, a central portion of said light beam comprising a central portion of said image passes through said aperture, and a peripheral portion of said light beam comprising a peripheral portion of said image is blocked by said plate, wherein said step of detecting said selected portion of said image comprises detecting said portion of said light beam that passes through said aperture, wherein said central portion of said image corresponds to a central portion of said light spot on said storage medium, said central portion of said light spot covering a location on said storage medium at which a domain of information is stored, and wherein said peripheral portion of said image corresponds to a peripheral portion of said light spot on said storage medium, said peripheral portion of said light spot covering locations on said storage medium at which domains of information other than said domain covered by said central portion of said light spot are stored.

46. A method of detecting a light beam reflected from storage media in an optical data storage system, comprising the steps of re-imaging a light beam produced by a light source and reflected from an optical storage medium to form an image of a light spot formed by said light beam on said storage medium, and detecting a selected portion of said image, said selected portion of said image containing only such information as is encoded on a region of said optical data storage medium that is illuminated by a corresponding portion of said light spot, wherein said step of re-imaging said light beam reflected from said storage medium comprises re-imaging said light beam onto at least one combination detector comprising a plurality of rows of light-sensitive detection elements, in a manner such that said light beam forms on said at least one detector said image of said light spot formed by said light beam on said storage medium and said selected portion of said image covers said light-sensitive detection elements, and said step of detecting said selected portion of said image comprises detecting said selected portion of said image by means of said light-sensitive detection elements, wherein said optical storage medium comprises a plurality of servo pads, a pair of said servo pads being encoded in proximity to a center line of each of a plurality of tracks of data on said optical storage medium, wherein said method further comprises the steps of:

producing first and second signals corresponding to intensity of light reflected from first and second servo pads of a said pair of servo pads and detected by a detection element in a tracking row of said combination detector, comparing said first signal with said second signal, and adjusting fine tracking of said light detection apparatus by an amount proportional to a difference between said first and second signals in a manner such that said tracking row of said light-sensitive detection elements is aligned with a said track, and wherein said at least one detector is constructed in a manner such that each said row is aligned with a said track when said tracking row is aligned with a said track.

47. A method in accordance with claim 46, wherein said image on said combination detector comprises a plurality of image portions covering a plurality of respective said light-sensitive detection element, and each said image portion is an image of a portion of said light spot formed by said light beam on said storage medium.

48. A method in accordance with claim 47 wherein said storage medium is a magneto-optical disk.

49. A method in accordance with claim 48 wherein said magneto-optical disk contains domains that rotate an angle of polarization of said light beam as said light beam reflects off of said magneto-optical disk, said method further comprises splitting said light beam reflected from said magneto-optical disk into two parts each having an intensity proportional to a respective component of polarization of said reflected light beam, and said step of detecting said image portions comprises detecting said image portions of said two parts of said light beam by means of said light-sensitive detection elements of two respective said combination detectors.

50. A method accordance with claim 49 wherein said step of re-imaging said light beam onto said at least one combination detector comprises respectively re-imaging two parts of said light beam onto said two combination detectors.

51. A method in accordance with claim 49 wherein said step of re-imaging said light beam onto said at least one combination detector comprises re-imaging said reflected light beam onto a polarization splitter that splits said light beam reflected from said magneto-optical disk into said two parts that are detected by said two combination detectors.

52. A method in accordance with claim 46, further comprising the steps of producing a plurality of differential signals, each said differential signal corresponding to an output of a said light-sensitive detection element in a first said detector minus an output of a corresponding said light-sensitive detection element in a second said detector, and analyzing said differential signals to detect domains of information smaller than said light spot on said storage medium.

53. A method in accordance with claim 52 wherein said step of analyzing said differential signals to detect domains comprises simultaneously detecting domains of information contained in a plurality of tracks on said magneto-optical disk.

54. A method in accordance with claim 53, wherein said combination detector is arranged to detect simultaneously domains contained in a plurality of distinct and respective tracks on said magneto-optical disk.

55. A method in accordance with claim 51 wherein said portion of said light spot on said storage medium, which corresponds to said image portion covering said at least one light-sensitive detection element, covers a location on said storage medium at which a domain of information is stored.

56. A method of detecting a light beam produced by a light source and reflected from storage media in an optical data storage system, comprising the steps of
re-imaging a light beam reflected from an optical storage medium to form an image of a light spot formed by said light beam on said storage medium, said light spot having a spatial distribution covering more than one domain of information stored in said storage medium,
and detecting a selected portion of said image of said light spot covering more than one domain of information,
said selected portion of said image containing only such information as is encoded on a region of said optical data storage medium that is illuminated by a corresponding portion of said light spot,
wherein said image is a magnified image of said light spot on said storage medium.

57. A method of detecting a light beam reflected from storage media in an optical data storage system, comprising the steps of
re-imaging a light beam produced by a light source and reflected from an optical storage medium to form an image of a light spot formed by said light beam on said storage medium,
and detecting a selected portion of said image,
said selected portion of said image containing only such information as is encoded on a region of said optical data storage medium that is illuminated by a corresponding portion of said light spot,
wherein said optical storage medium comprises a magnetic layer for storing said information and a refraction layer overlying said magnetic layer, said refraction layer has an index of refraction such that the wavelength of said light beam within said refraction layer is less than the wavelength of said light beam in air, said information encoded on said magnetic layer comprises domains smaller than a wavelength of said light beam in air but not smaller than the wavelength of said light beam as said light beam passes through said refraction layer, whereby said refraction layer has an index of refraction high enough to enable said domains to be resolved during said step of detecting said selected portion of said image.

* * * * *

UNITED STATES PATENT AND TRADEMARK OFFICE
CERTIFICATE OF CORRECTION

PATENT NO.  : 5,247,510

DATED       : September 21, 1993

INVENTOR(S) : Neville K.S. Lee et al.

It is certified that error appears in the above-identified patent and that said Letters Patent is hereby corrected as shown below:

Title page, under [56] References Cited, U.S. PATENT DOCUMENTS, insert the following reference:

5,191,563   3/1993   Lee et al. ......... 369/13

Cover page, under [57] ABSTRACT, line 6, after "image" and before "The", insert a period.

Col. 2, line 6, "NeVille" should be --Neville--.

Col. 2, line 49, after "aperture" and before "The", insert a period.

Col. 14, line 1, "comprising" should be --comprises--.

Col. 15, line 47, "element" should be --elements--.

Col. 15, line 50, "element" should be --elements--.

Col. 20, line 21, "element" should be --elements--.

Col. 21, line 7, "claim 51" should be --claim 46--.

UNITED STATES PATENT AND TRADEMARK OFFICE
CERTIFICATE OF CORRECTION

PATENT NO. : 5,247,510
DATED : September 21, 1993
INVENTOR(S) : Neville K.S. Lee et al.

It is certified that error appears in the above-indentified patent and that said Letters Patent is hereby corrected as shown below:

Col. 15, line 48, "comprises" should be --comprising--.

Signed and Sealed this

Eleventh Day of June, 1996

Attest:

BRUCE LEHMAN

Attesting Officer

Commissioner of Patents and Trademarks